United States Patent
Zhuang

(10) Patent No.: US 6,196,562 B1
(45) Date of Patent: Mar. 6, 2001

(54) PUSH DEVICE OF A STROLLER

(76) Inventor: Yu-Lin Zhuang, 58, Ma Yuan West St., Taichung (TW)

( * ) Notice: Subject to any disclaimer, the term of this patent is extended or adjusted under 35 U.S.C. 154(b) by 0 days.

(21) Appl. No.: 09/382,657

(22) Filed: Aug. 25, 1999

(51) Int. Cl.[7] .................................................. B62B 7/00
(52) U.S. Cl. ................ 280/47.38; 280/650; 280/47.371; 16/110.1; 16/421; 16/430
(58) Field of Search .............................. 280/47.38, 47.34, 280/647, 650, 658, 642, 250.1, 47.371, 47.36, 649; 16/110.1, 114.1, 411, 421, 430

(56) References Cited

U.S. PATENT DOCUMENTS

| | | | |
|---|---|---|---|
| 2,483,307 | * | 9/1949 | Wheary, Jr. . |
| 2,987,149 | * | 6/1961 | Finkelstein . |
| 3,873,117 | * | 3/1975 | Perego .......................... 280/47.38 X |
| 5,008,970 | * | 4/1991 | Tsai .................................... 15/236.01 |
| 5,299,475 | * | 4/1994 | Stroop . |
| 5,475,896 | * | 12/1995 | Wang .................................... 16/114.1 |
| 5,579,556 | * | 12/1996 | Chung ......................... 280/47.371 X |
| 6,119,309 | * | 9/2000 | Lu ....................................... 16/114.1 |

* cited by examiner

Primary Examiner—J. J. Swann
Assistant Examiner—F. Zeender

(57) ABSTRACT

A push device of a stroller has an upper casing, a generally L-shaped sleeve, and a generally L-shaped rod having a distal arm and a proximal arm. The distal arm has two through apertures. The upper casing has an interior, a periphery flange, and two hollow posts. Each hollow post has a recess hole. The generally L-shaped sleeve has a distal portion and a proximal portion receiving the proximal arm. The distal portion has a groove, a periphery recess engaging with the periphery flange, two protruded bars inserted in the recess holes via the through apertures, and a bottom corrugation.

1 Claim, 5 Drawing Sheets

PUSH DEVICE OF A STROLLER

BACKGROUND OF THE INVENTION

The present invention relates to a push device of a stroller. More particularly, the present invention relates to a push device of a stroller which is reinforced.

Referring to FIGS. 4 and 5, a conventional push device of a stroller has a push rod 9, an upper portion of the push rod 9 inserted in a handle 91, and two rivets 92 fastening the handle 91 and the upper portion of the push rod 9 together. Since the handle 91 is made of plastics, the strength of the handle 91 will be weakened after a long period of usage.

SUMMARY OF THE INVENTION

An object of the present invention is to provide a push device of a stroller which can be reinforced.

Another object of the present invention is to provide a push device of a stroller which can be assembled without rivets.

Accordingly, a push device of a stroller comprises an upper casing, a generally L-shaped sleeve, and a generally L-shaped rod having a distal arm and a proximal arm. The distal arm of the generally L-shaped rod has two through apertures. The upper casing has an interior, a periphery flange, and two hollow posts. Each of the hollow posts has a recess hole. The generally L-shaped sleeve has a distal portion and a proximal portion. The proximal portion of the generally L-shaped sleeve has a through hole. The distal portion of the generally L-shaped sleeve has a groove, a periphery recess, two protruded bars, and a bottom corrugation. The proximal arm of the generally L-shaped rod is inserted through the respective through hole of the proximal portion of the generally L-shaped sleeve until the distal arm of the generally L-shaped rod is inserted in the groove of the distal portion of the generally L-shaped sleeve. The upper casing covers the distal arm of the generally L-shaped rod until the periphery flange of the upper casing engages with the periphery recess of the distal portion of the generally L-shaped sleeve. Each of the protruded bars is inserted through the respective through aperture and inserted in the respective recess hole.

DETAILED DESCRIPTION OF THE INVENTION

Figure 1:
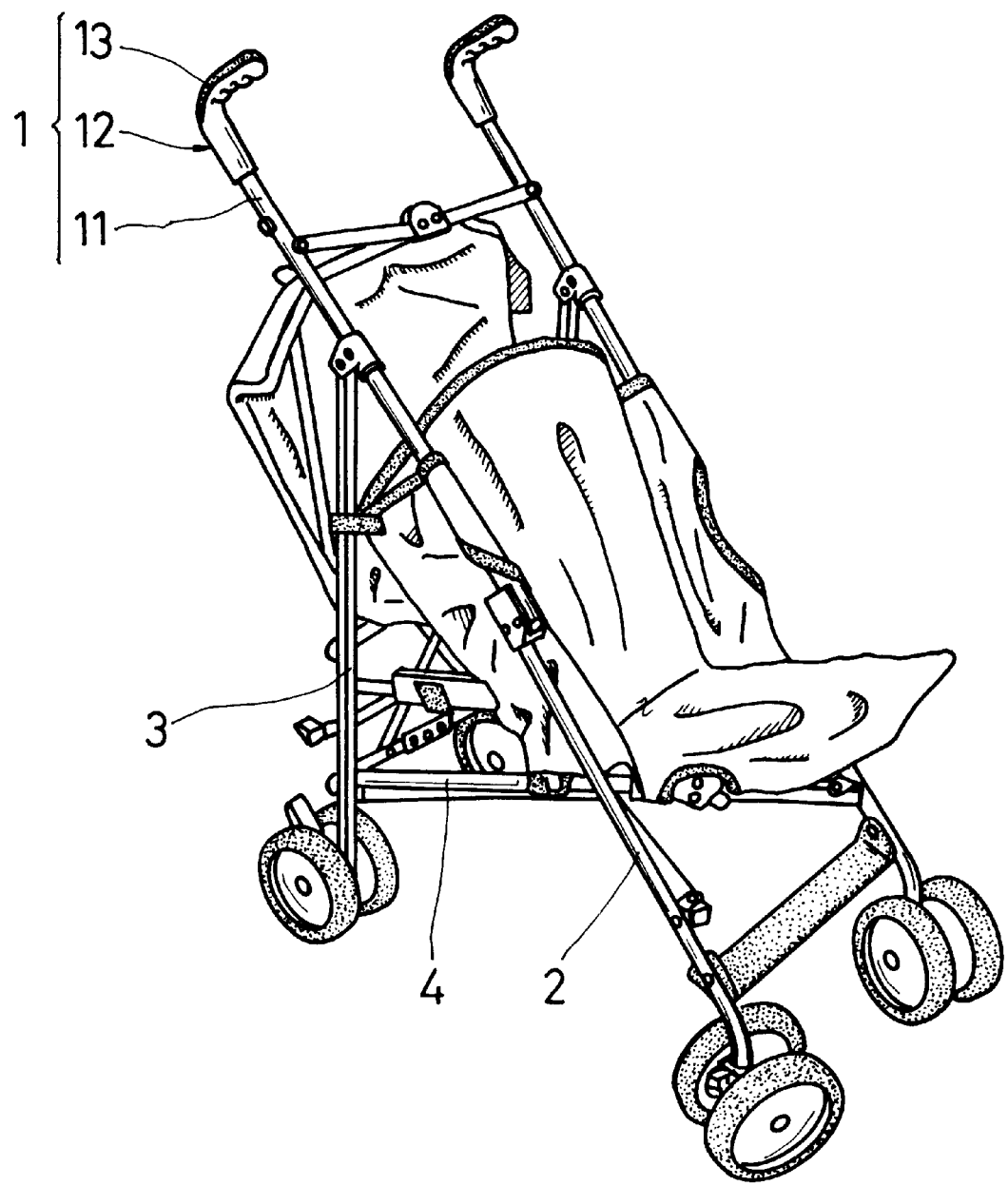
FIG. 1 is a perspective view of a stroller of a preferred embodiment in accordance with the present invention.
Figure 2:
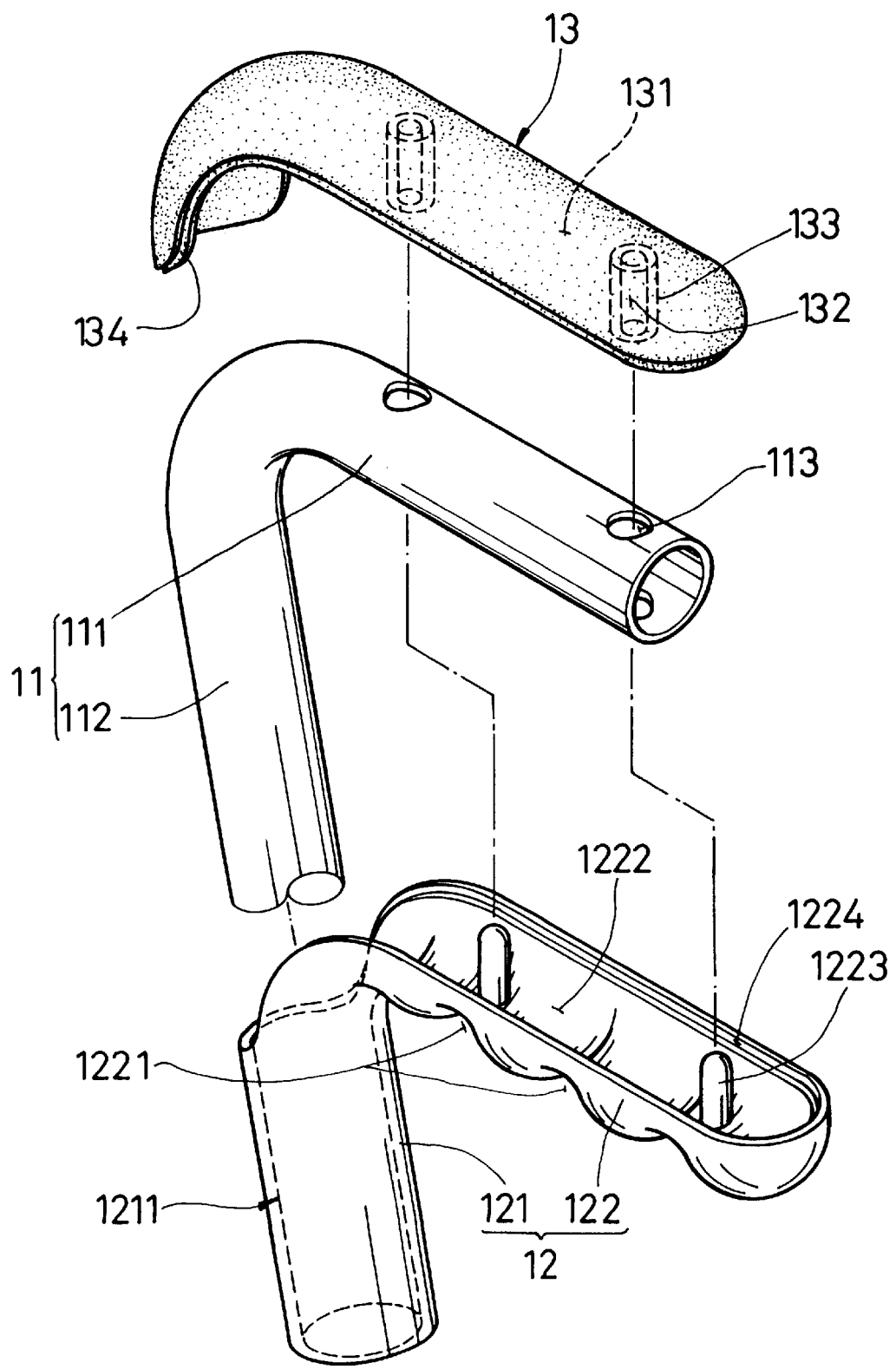
FIG. 2 is a perspective exploded view of a push device of a stroller of a preferred embodiment in accordance with the present invention.
Figure 3:
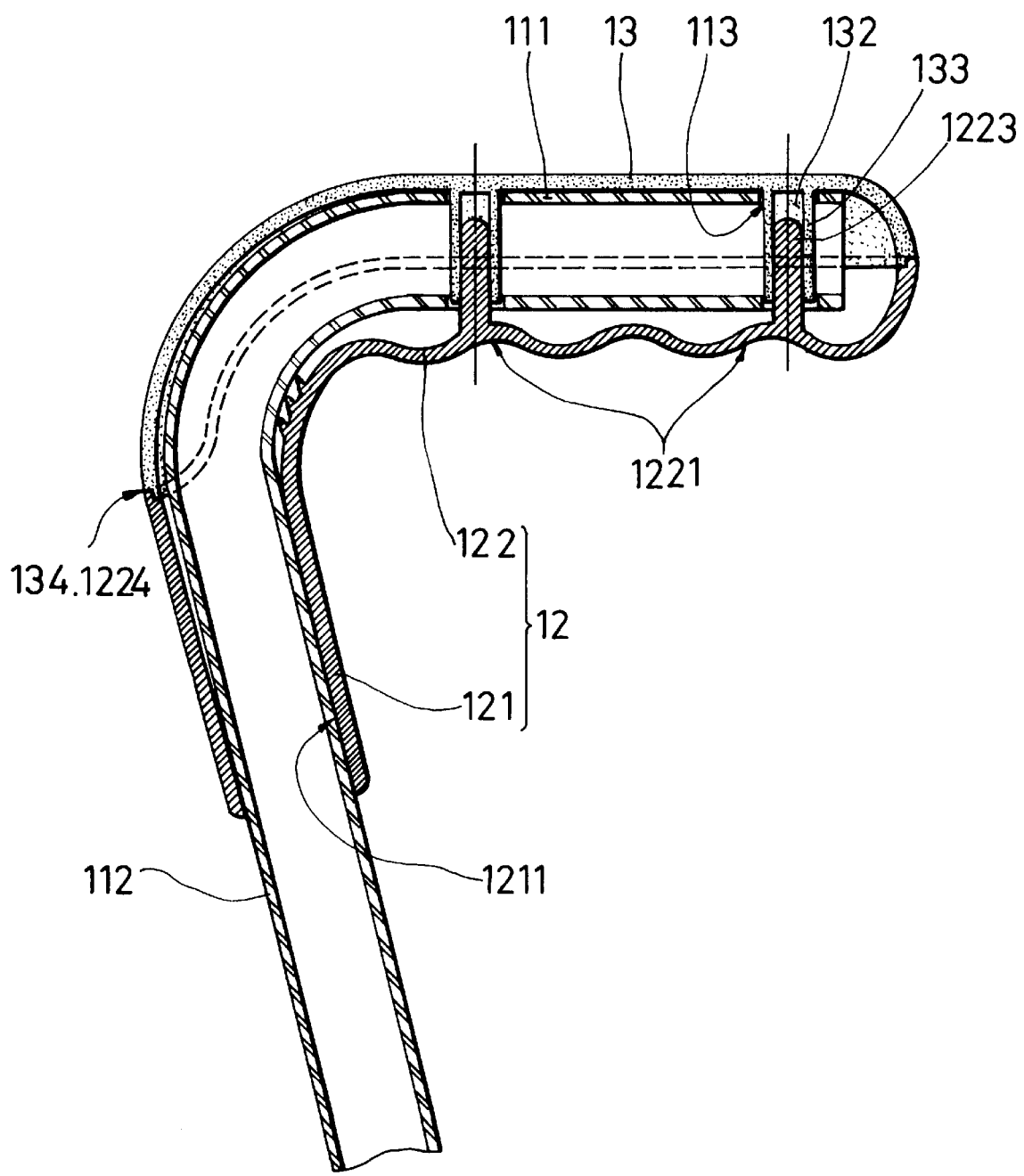
FIG. 3 is a sectional assembly view of a push device of a stroller of a preferred embodiment in accordance with the present invention.
Figure 4:
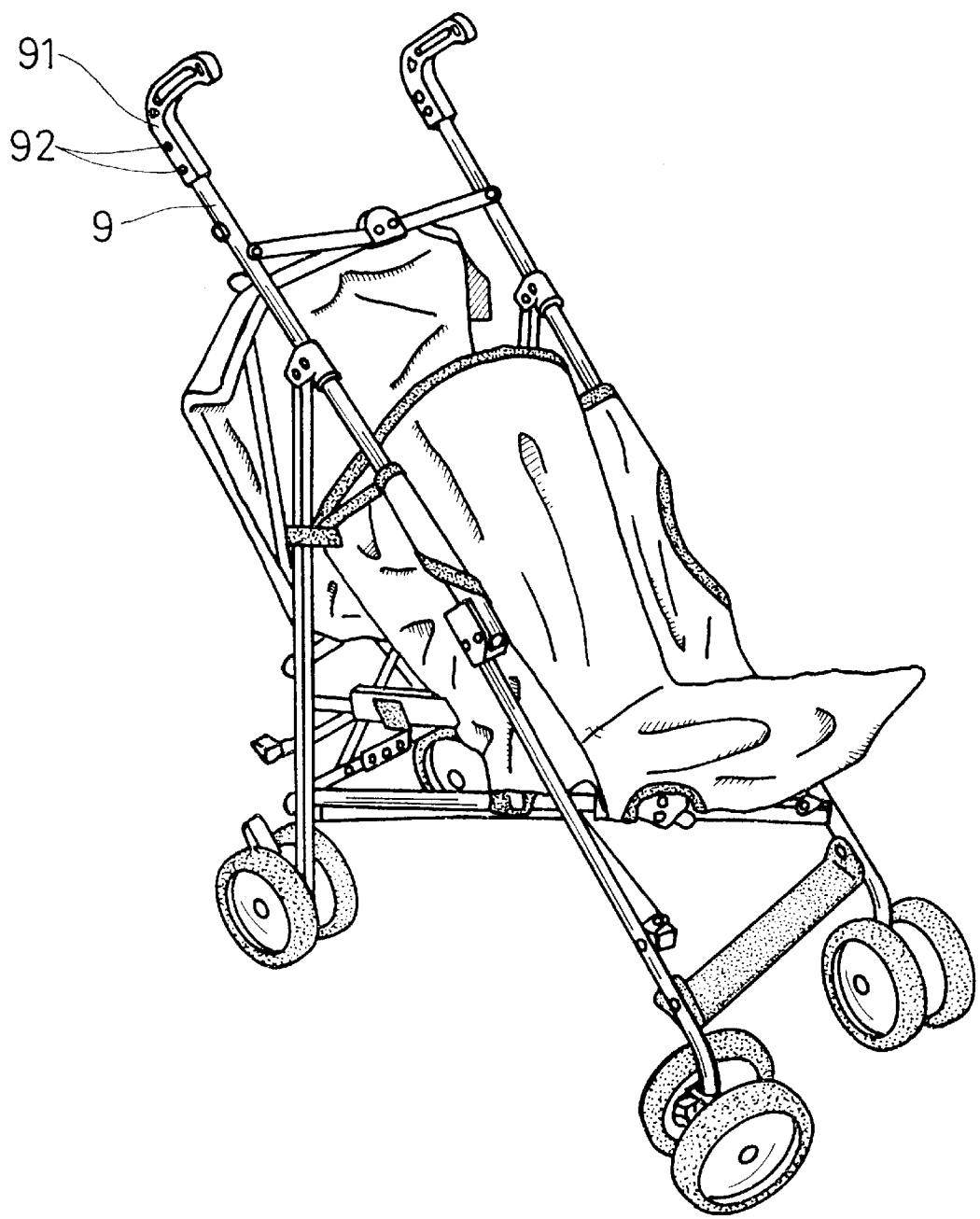
FIG. 4 is a perspective view of a stroller of the prior art.
Figure 5:
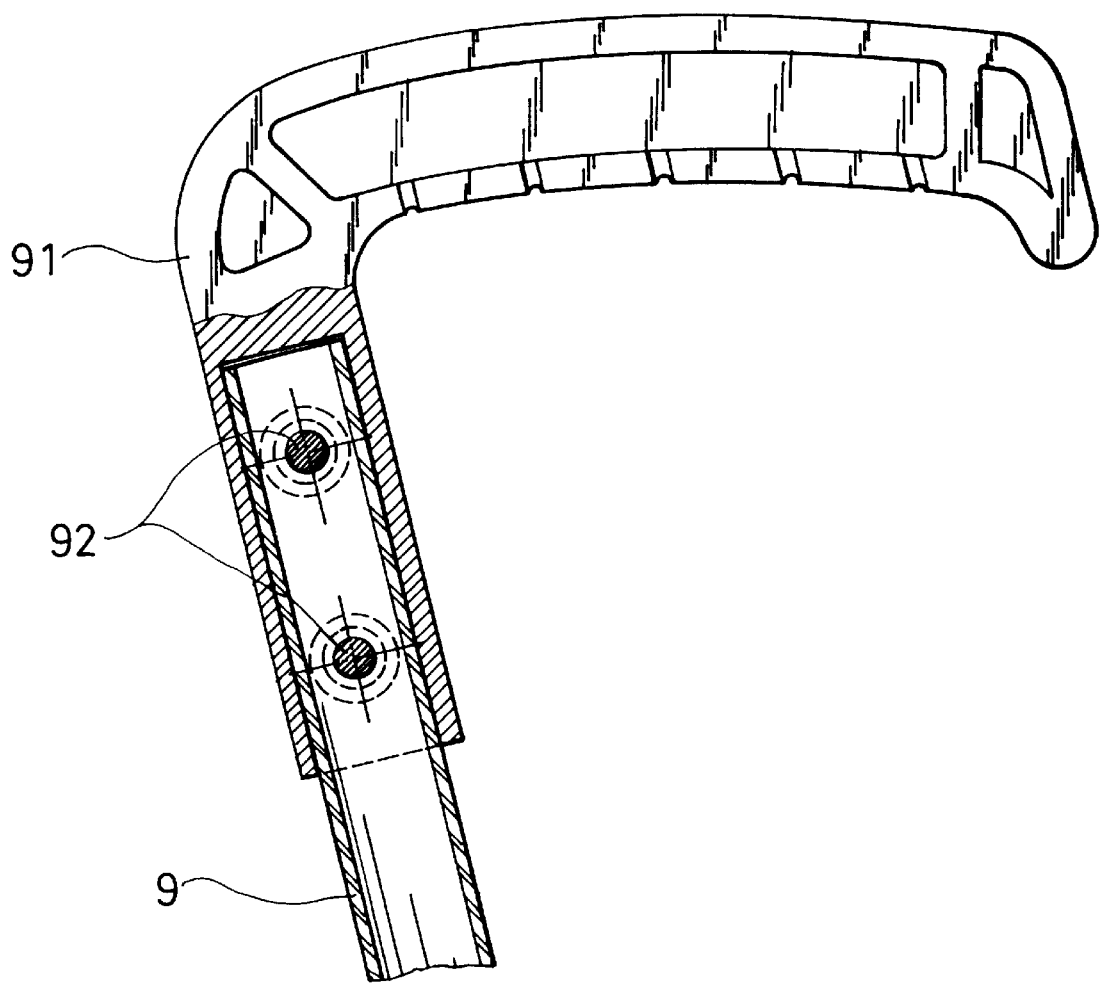
FIG. 5 is a sectional assembly view of a push device of a stroller of the prior art.

Referring to FIGS. 1 to 3, a stroller comprises an X-shaped bottom connection frame 4, two push devices 1, two rear wheel support rods 3, and two front wheel support rods 2. The X-shaped bottom connection frame 4 is connected to the rear wheel support rods 3 and the front wheel support rods 2.

Each of the push devices 1 of the stroller comprises an upper casing 13, a generally L-shaped sleeve 12, and a generally L-shaped rod 11 having a distal arm 111 and a proximal arm 112 connected to the respective rear wheel support rod 3 and the respective front wheel support rod 2.

The distal arm 111 of the generally L-shaped rod 11 has two through apertures 113.

The upper casing 13 has an interior 131, a periphery flange 134, and two hollow posts 133. Each of the hollow posts 133 has a recess hole 132.

The generally L-shaped sleeve 12 has a distal portion 122 and a proximal portion 121. The proximal portion 121 of the generally L-shaped sleeve 12 has a through hole 1211. The distal portion 122 of the generally L-shaped sleeve 12 has a groove 1222, a periphery recess 1224, two protruded bars 1223, and a bottom corrugation 1221.

The proximal arm 112 of the generally L-shaped rod 11 is inserted through the respective through hole 1211 of the proximal portion 121 of the generally L-shaped sleeve 12 until the distal arm 111 of the generally L-shaped rod 11 is inserted in the groove 1222 of the distal portion 122 of the generally L-shaped sleeve 12.

The upper casing 13 covers the distal arm 111 of the generally L-shaped rod 11 until the periphery flange 134 of the upper casing 13 engages with the periphery recess 1224 of the distal portion 122 of the generally L-shaped sleeve 12.

Each of the protruded bars 1223 is inserted through the respective through aperture 113 and inserted in the respective recess hole 132.

The upper casing 13 and the distal portion 122 of the generally L-shaped sleeve 12 reinforce the distal arm 111 of the generally L-shaped rod 11 while the user holds the upper casing 13 and the distal portion 122 of the generally L-shaped sleeve 12.

Since each of the protruded bars 1223 is inserted in the respective recess hole 132 and the periphery flange 134 of the upper casing 13 engages with the periphery recess 1224 of the distal portion 122 of the generally L-shaped sleeve 12, the upper casing 13 couples with the distal portion 122 of the generally L-shaped sleeve 12 stably without any rivet, bolt, nor screw.

The bottom corrugation 1221 of the distal portion 122 of the generally L-shaped sleeve 12 facilitates the user to hold the distal portion 122 of the generally L-shaped sleeve 12 stably.

The invention is not limited to the above embodiment but various modification thereof may be made. Further, various changes in form and detail may be made without departing from the scope of the invention.

I claim:

1. A push device of a stroller comprises:

an upper casing, a generally L-shaped sleeve, and a generally L-shaped rod having a distal arm and a proximal arm, the distal arm of the generally L-shaped rod having two through apertures, the upper casing having an interior, a periphery flange, and two hollow posts, each of the hollow posts having a recess hole, the generally L-shaped sleeve having a distal portion and a proximal portion, the proximal portion of the generally L-shaped sleeve having a through hole, the distal portion of the generally L-shaped sleeve having a groove, a periphery recess, two protruded bars, and a bottom corrugation, the proximal arm of the generally L-shaped rod inserted through the respective through hole of the proximal portion of the generally L-shaped sleeve until the distal arm of the generally L-shaped rod is inserted in the groove of the distal portion of the generally L-shaped sleeve, the upper casing covering the distal arm of the generally L-shaped rod until the periphery flange of the upper casing engages with the periphery recess of the distal portion of the generally L-shaped sleeve, and each of the protruded bars inserted through the respective through aperture and inserted in the respective recess hole.

\* \* \* \* \*